United States Patent [19]
Mann

[11] Patent Number: 5,689,691
[45] Date of Patent: Nov. 18, 1997

[54] COMPUTER BUS UTILIZATION DETERMINATION APPARATUS

[75] Inventor: James M. Mann, Cypress, Tex.

[73] Assignee: Compaq Computer Corporation, Houston, Tex.

[21] Appl. No.: 555,255

[22] Filed: Nov. 8, 1995

Related U.S. Application Data

[63] Continuation of Ser. No. 119,705, Sep. 10, 1993, abandoned.

[51] Int. Cl.$^6$ ............................................. G06F 13/14
[52] U.S. Cl. ................................... 395/557; 395/287
[58] Field of Search .............................. 395/551, 557, 395/559, 287, 838

[56] References Cited

U.S. PATENT DOCUMENTS 4,719,567  1/1988  Whittington et al. ............. 364/DIG. 1
5,241,632  8/1993  O'Connell et al. ..................... 395/297
5,263,163  11/1993  Holt et al. ............................... 395/730

*Primary Examiner*—Thomas M. Heckler
*Attorney, Agent, or Firm*—Pravel, Hewitt, Kimball & Krieger

[57] ABSTRACT

Circuitry for monitoring the idle periods on the EISA bus and a program using this known value to determine percentage utilization of the EISA bus. A counter is used to count the number of synchronizing clock periods during which the EISA bus is idle. To determine if the EISA bus is idle, certain logic monitors the EISA bus signals and the arbiter activity to determine if cycles are actually occurring. If so, the EISA bus is not idle and the counter is not incremented. If there is no activity, the counter increments on each BCLK clock. The computer system periodically reads this counter. The computer system determines the interval between read operations of the counter and uses this interval in combination with the counter value and BCLK signal rate to determine the percentage utilization.

8 Claims, 5 Drawing Sheets

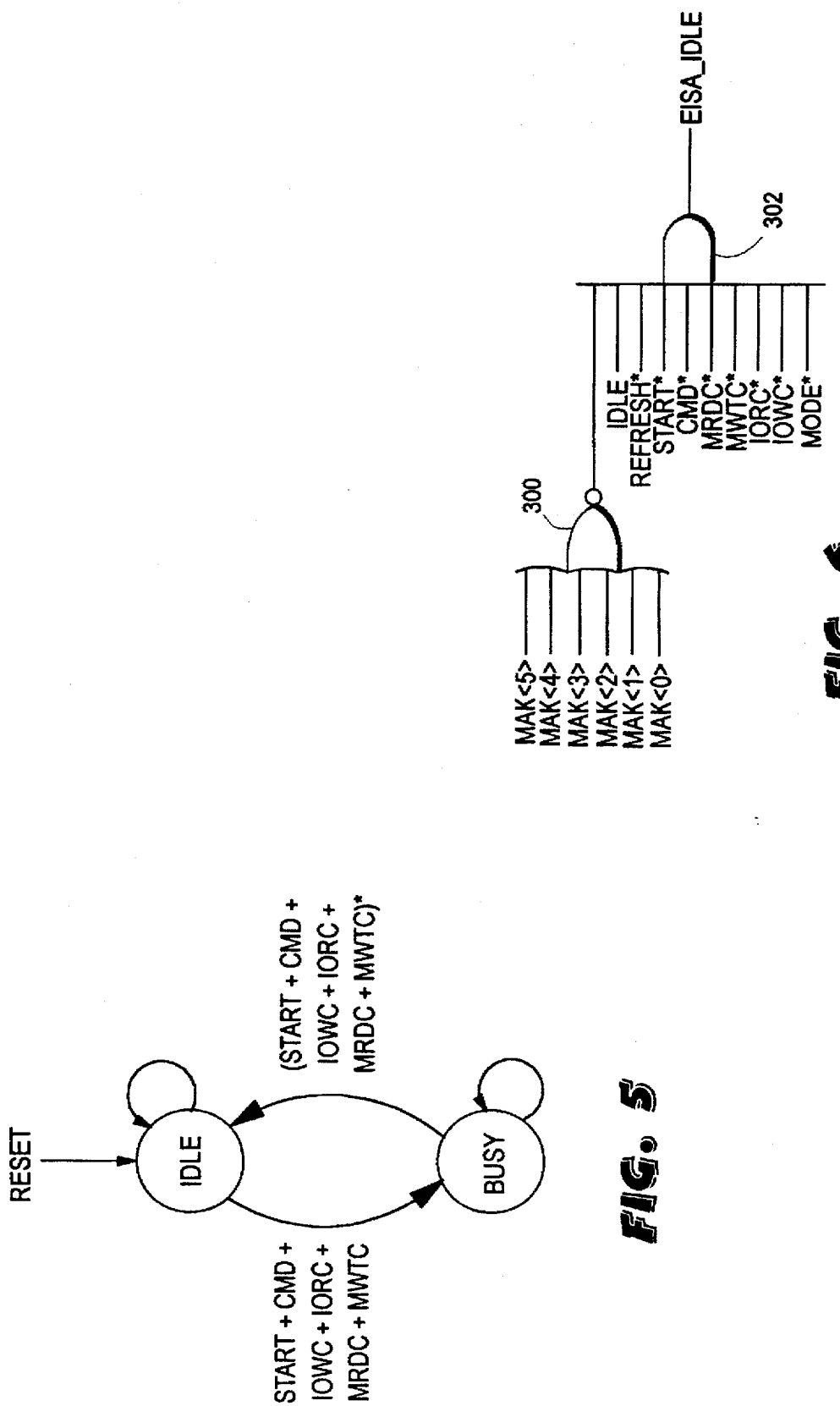

COMPUTER BUS UTILIZATION DETERMINATION APPARATUS

This is a continuation of application Ser. No. 08/119,705 filed on Sep. 10, 1993, abandoned.

BACKGROUND OF THE INVENTION

1. Field of the Invention

The invention relates to computer systems, and more particularly to an apparatus for determining the percentage utilization of an input/output bus contained in the computer system.

2. Description of the Related Art

As their capabilities have developed, personal computers have been utilized for more and more varied functions. The most common application is naturally as workstations, where they perform personal productivity tasks. However, given the advent and extreme growth of local area networks (LANs), a major application of personal computers is to serve as the file servers or central storage and processing facilities of those LANs. This use has required slightly different capabilities of the personal computers used as file servers as compared to those personal computers used as workstations. For example, while the ISA bus is usually quite satisfactory as an input/output (I/O) bus to receive circuit cards in a workstation, the available bandwidth and expandability of the ISA bus is simply too limited for use in a high performance file server. Typically a file server will contain a number of network interface cards and a number of hard disk controller cards to allow high throughput network transactions and very high throughput disk operations. To this end, many file servers today include what is referred to as the EISA or Extended Industry Standard Architecture bus as the I/O bus. The EISA bus allows greatly expanded bandwidth by providing a wider data path and significantly higher data transfer rates. With this greatly improved I/O bus capability, it is then possible to install a greater number of cards which utilize it.

As more and more of these cards are installed, one concern then becomes whether the bus has become saturated, as was a common problem on the systems based on ISA buses. If the bus becomes saturated, there is no value to be gained by adding further cards to the bus. Instead a new file server must be added or other remedies taken. To this end it is desirable to be able to easily and readily determine the utilization of an I/O bus such as the EISA bus.

While there are various tools available to monitor utilization of the network itself, such as Ethernet or Token Ring sniffers or monitors, no such capability is available to monitor utilization of the EISA bus. Thus the system administrator cannot accurately determine EISA bus utilization in the computer and must merely make guesses. This often could result in errors. For instance, it could turn out that a different subsystem is actually the critical path in terms of performance. The upgrade path might be completely different if that were known. Because of this lack of accurate information, alternatives must be developed almost on guess work, resulting in trial and error, which is time consuming and costly. With more accurate information it would be possible to better maintain and develop a LAN.

SUMMARY OF THE INVENTION

A computer system according to the present invention includes circuitry for monitoring the idle periods on the EISA bus and runs a program using this known value to determine percentage utilization of the EISA bus. This allows greatly improved determinations of the available bandwidth and whether the EISA bus has become saturated. With this better knowledge, a LAN administrator can then determine the proper course of growth, either a new file server, replacement of certain boards or simply installation of more boards to better utilize the existing server capabilities.

A counter is used to count the number of synchronizing clock periods during which the EISA bus is idle. Preferably the synchronizing clock signal is the BCLK signal. To determine if the EISA bus is idle, certain logic monitors the EISA bus signals and the arbiter activity to determine if cycles are actually occurring. If so, the EISA bus is not idle and the counter is not incremented. When, however, there is no activity, the counter increments on each BCLK clock. The computer system periodically reads this counter. Upon reading the counter, it is reset to zero and the count restarted. The computer determines the interval between read operations of the counter and uses this interval in combination with the counter value and BCLK signal rate to determine the percentage utilization. In this manner by simply reading the counter and knowing the time interval since the last read operation, the computer system can readily determine the bus utilization.

BRIEF DESCRIPTIONS OF THE DRAWING

A better understanding of the present invention can be obtained when the following detailed description of the preferred embodiment is considered in conjunction with the following drawings, in which:

FIG. 5 is a state machine used to determine EISA bus idle state;

FIG. 6 is a schematic diagram of EISA bus idle determining circuitry used in the first computer.

DETAILED DESCRIPTION OF THE PREFERRED EMBODIMENT

Figure 1:
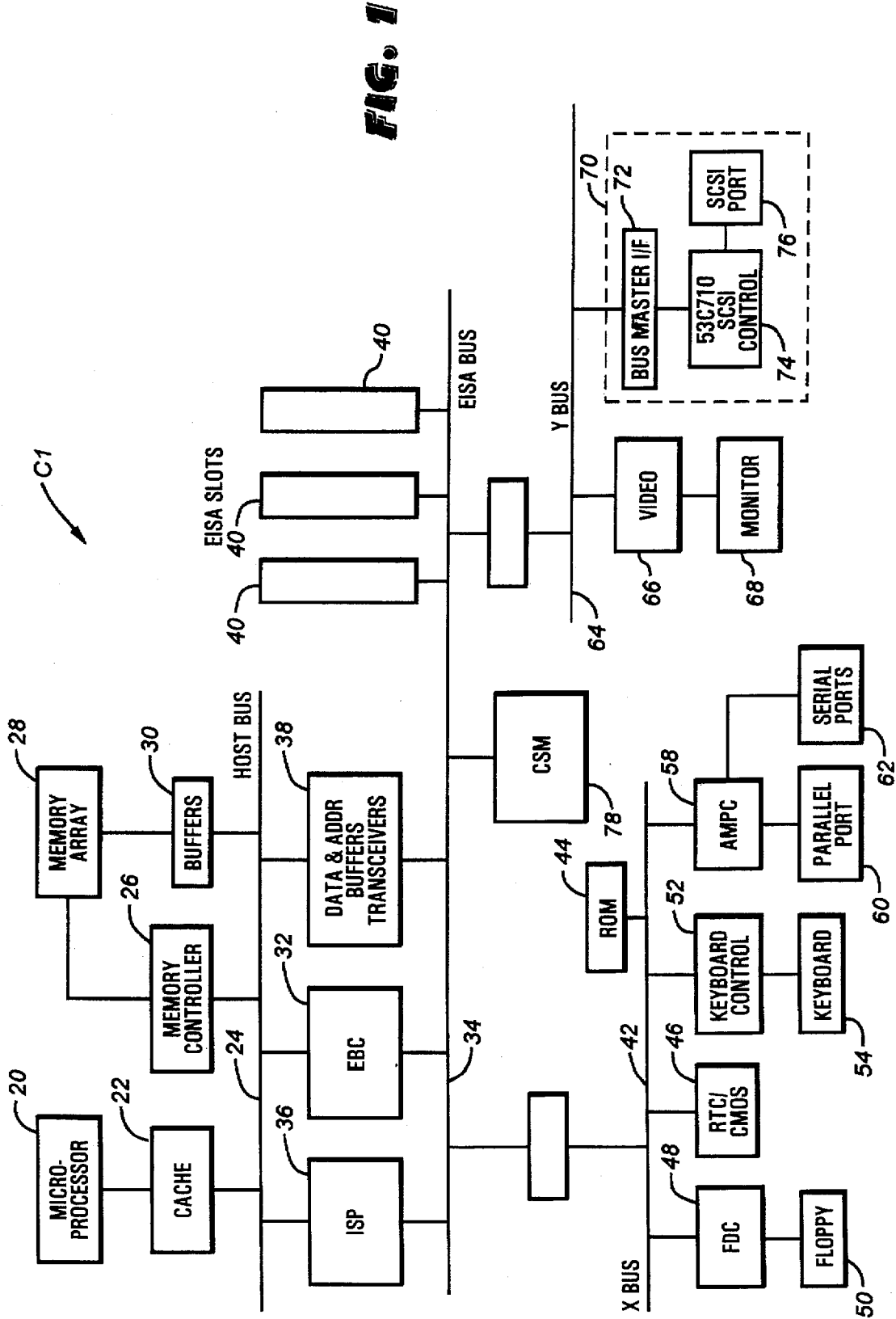
FIG. 1 is a block diagram of a first computer according to the present invention.

Referring now to FIG. 1, a computer system C1 according to the present invention is shown. A microprocessor 20, preferably an 80486 from Intel Corporation, is connected to a cache controller 22. The cache controller 22 in turn is connected to a host bus 24 which includes address, data and control portions. A memory controller 26 is connected to the host bus 24 to receive and control main memory operations. The memory controller 26 is connected to the main memory array 28 of the computer C1, with the data from the main memory array 28 going through a data buffer 30 to the host bus 24.

Also connected to the host bus 24 is in an EISA bus controller (EBC) 32 which handles translation of signals between the host bus 24 and an EISA bus 34, the input/output bus preferably used. It is of course understood that other I/O buses could be utilized. The EBC 32 is connected to an integrated system peripheral (ISP) 36 which includes a DMA controller, timers, interrupt controller, EISA bus arbiter and other devices as necessary and common in an EISA system. The ISP 36 is connected to the host bus 24 and the EISA bus 34. In addition, the EBC 32 is connected to a series of address and data latches and transceivers 38 which are connected to the host bus 24 and EISA bus 34 and provide the necessary address and data latching and buffering to allow development of an EISA system. Also connected to the EISA bus 34 are a series of EISA slots 40 which receive interchangeable circuit boards.

Two additional buses are developed from the EISA bus 34. The first of these is referred to as the X bus 42 which is conventionally a 16-bit bus used to connect with the majority of support chips present on system board of the computer system C1. For example, these support chips include a read only memory (ROM) 44; a real time clock (RTC) and CMOS memory 46; a floppy disk controller 48, which in turn is connected to a floppy disk drive 50; an 8042 keyboard controller 52, which is in turn connected to a keyboard 54 and a pointing device (not shown); and a multiple peripheral controller (AMPC) 58 which provides a parallel port 60 and a series of serial ports 62. These are devices which are conventional in a small computer system C such as the one shown and are provided to indicate a complete computer and are not necessarily related to the present invention.

A second bus developed from the EISA bus 34 is the Y bus 64, which is preferably a 32-bit bus to allow high data rate transfers to the EISA bus 34. A video controller 66 and its associated monitor 68 are connected to the Y bus 64. A SCSI subsystem 70 connected to the Y bus 64 includes a bus master interface 72, a 53C710 SCSI controller 74 as referenced in the background and a SCSI port 76 which is used to connect to SCSI devices. In the case of the computer system C, the SCSI subsystem 70 is located on the system board as the computer system C1 preferably includes internal SCSI hard drives for performance reasons.

A server management chip (CSM) 78 is connected to the EISA bus 34 and contains counter and bus idle circuitry according to the present invention. The CSM 78 contains a command/status port and a data port to allow interaction with the microprocessor 20. The CSM 78 performs numerous functions related to file server management in the preferred embodiment. These functions include temperature and fan status monitoring, power supply shutdown on critical conditions or on command, communication with a remote device or pager for alert functions and EISA bus utilization monitoring. The EISA bus utilization monitoring is described in more detail below.

Figure 2:
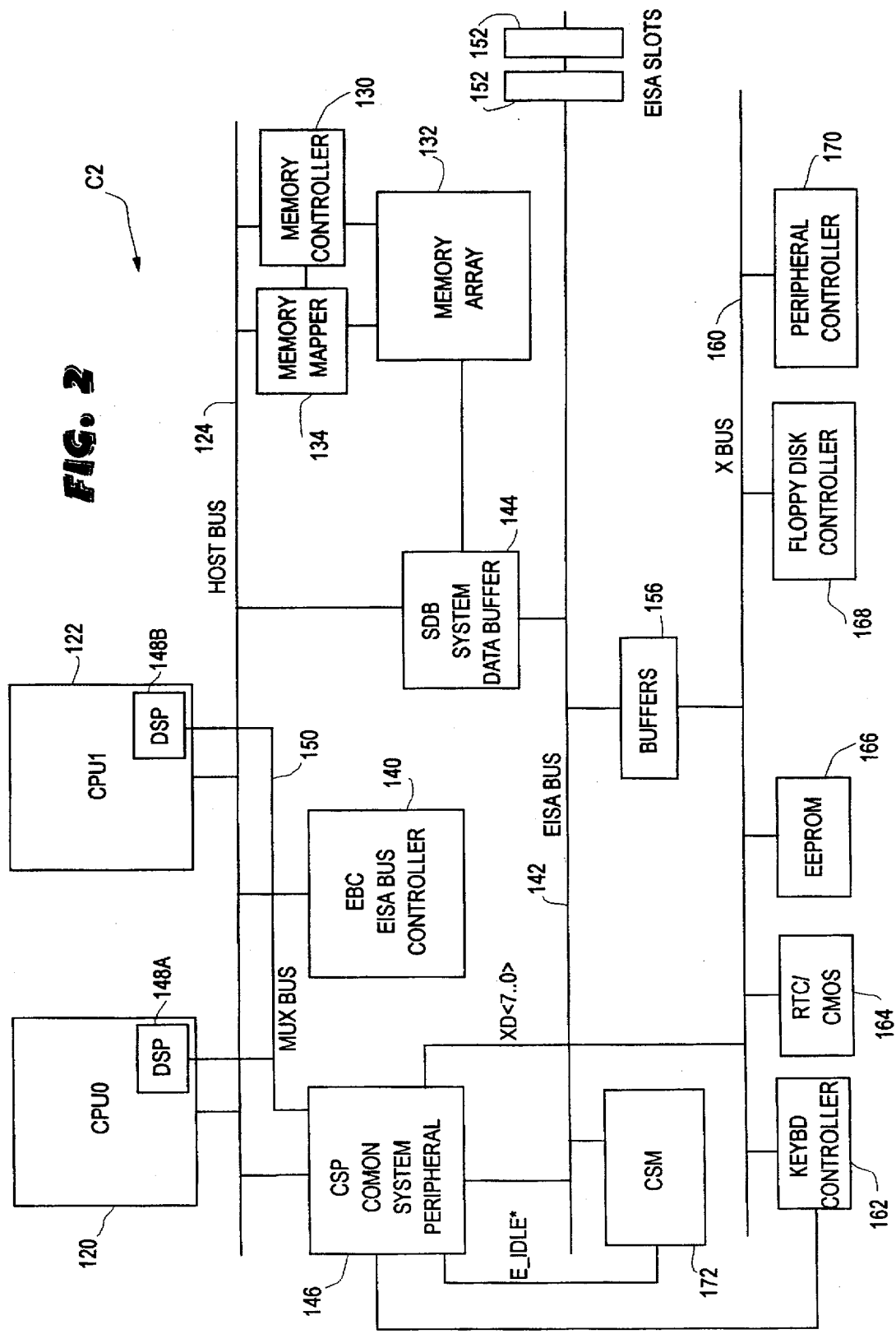
FIG. 2 is a block diagram of a second computer according to the present invention.

Referring now to FIG. 2, a computer system C2 is shown. The computer system C2 is a multiprocessor system with two processors in the preferred embodiment, although a computer system according to the present invention may include more processors or may be a single processor system. The elements of the computer system C2 that are not significant to the present invention, other than to illustrate an example of a fully configured computer system, are not discussed in detail.

The computer system C2 preferably includes two CPUs, referred to as CPU 120 and CPU 122, respectively, which are connected to a host bus 124. In the preferred embodiment, CPU 120 is logically assigned the position of CPU0, and CPU 122 is assigned logical CPU1, although these assignments are preferably programmable and may be changed. A memory controller 130 is coupled to the host bus 124 and also to a main memory array 132, where the memory array 132 preferably comprises dynamic random access memory (DRAM). Memory mapper logic 134 is coupled to the host bus 124, the memory controller 130 and the memory array 132, and provides memory mapping functions to facilitate memory accesses to the memory array 132.

The computer system C2 includes an expansion bus 142, where the expansion bus 142 is preferably the Extended Industry Standard Architecture (EISA) bus, although other types of expansion buses are contemplated. A corresponding EISA bus controller (EBC) 140 is coupled between the host bus 124 and the EISA bus 142. The EBC 140 provides various bus cycle translation and conversion functions to facilitate transfers between the host bus 124 and the EISA bus 142. A system data buffer (SDB) 144 is coupled to the host bus 124, the EISA bus 142 and the memory array 132. The SDB 144 functions to buffer and transfer data between the host bus 124 and the memory array 132, between the host bus 124 and the EISA bus 142 and between the EISA bus 142 and the memory array 132. A logic block referred to as the common system peripheral (CSP) 146 is coupled between the host bus 124 and the EISA bus 142. The CSP 146 is coupled to logic blocks referred to as the distributed system peripherals (DSPs) 148a and 148b in the CPUs 120 and 122, respectively, through a multiplexed (MUX) bus 150. The CSP 146 is also coupled to a keyboard controller 162 receiving a mouse interrupt signal MSEINT* and a keyboard interrupt signal KBINT*.

The EISA bus 142 includes a plurality of EISA slots 152 and 154 for receiving EISA expansion cards, such as network interface or hard disk interface cards for example. The EISA bus 142 is coupled through buffers 156 to a bus referred to as the X bus 160. A number of peripheral devices are coupled to the X bus 160, including the keyboard controller 162, a real time clock (RTC) 164, an electrically erasable programmable read only memory (EEPROM) 166, a floppy disk controller 168, and a peripheral controller chip 170 which includes numerous parallel ports and UARTS (universally asynchronous receiver/transmitters). The CSP 146 is coupled to an 8-bit data bus of the X bus 160 referred to as XD, where the XD data bus includes signals XD<15..0>. The XD data bus is the latched version of corresponding data bits residing on the EISA bus 142.

A server management chip (CSM) 172 is also present in the computer system C2. The CSM 172 is again connected to the EISA bus 142, but has an additional connection to the CSP 146. In this embodiment the CSP 146 performs the EISA bus idle status determination and provides an $E_{13}$ IDLE* signal to the CSM 172. In the embodiment of the computer system C1, the CSM 78 uses internal circuitry to perform this function. Both alternatives are described below.

Figure 3:
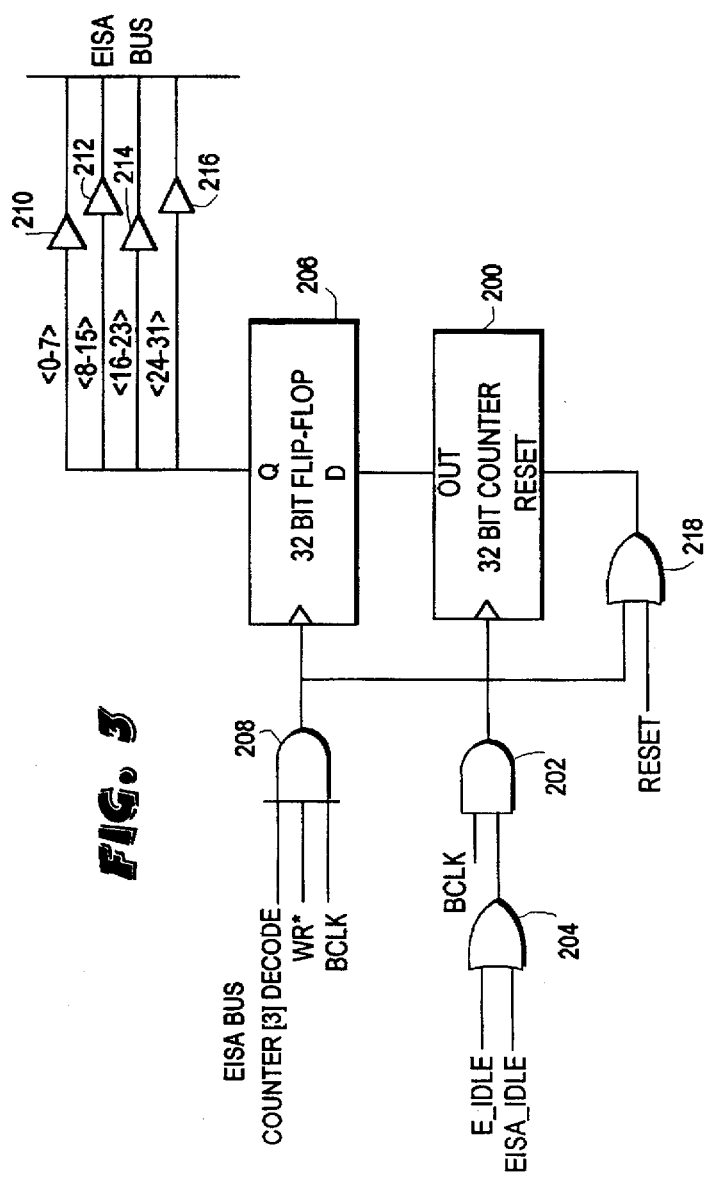
FIG. 3 is a schematic diagram of circuitry in the server management logic of FIGS. 1 and 2.

Referring now to FIG. 3, certain portions of the EISA bus monitoring circuitry in the CSM 78, 172 is shown. A 32 bit counter 200 is used to count idle bus cycles. The clock input of the counter 200 is connected to the output of a two input AND gate 202. The BCLK signal, the basic synchronizing and clock signal of the EISA bus, is one input to the AND gate 202, while the second input is provided by the output of a two input OR gate 204. One input to the OR gate 204 is the E_IDLE signal, which is the inverse of the E_IDLE* signal provided from the CSP 146, the development which is described below. The second input to the OR gate 204 is the EISA_IDLE signal, which is an internal signal developed in the CSM 78, 172 which indicates bus idle condition.

A 32 bit D-type flip-flop 206 is connected to the 32 bit counter 200. The outputs of the counter 200 are connected to the D inputs of the flip-flop 206. The flip-flop 206 is clocked by the output of a three input AND gate 208. Two inputs to the AND gate 208 are the BCLK signal and a signal referred to as WR*, which when high indicates that a read operation is occurring. The third input is a signal which indicates as address decode to the most significant byte of the EISA bus counter address location. Preferably the EISA bus counter is a 4 byte register, which is accessed in single byte increments, from the most significant to the least significant. The single byte interface allows simplified development of the CSM 78, 172 by only requiring a single data byte interface to the EISA bus. Thus when the most significant byte is read, the value of the counter 200 is latched into the flip-flop 206. The outputs of the flip-flop 206 are provided to four 8 bit tri-state buffers 210, 212, 214 and 216, which are activated upon a read to the respective address location of the EISA bus counter.

The output of the AND gate 208 is also provided as one input to a two input OR gate 218. The second input to the OR gate 218 is the RESET signal, which indicates that the computer system has been reset. The output of the OR gate 218 is provided to the reset input of the counter 200, so that either upon system reset or upon reading of the most significant byte of the EISA bus counter, the counter 200 is reset and clocking starts again.

Figure 4:
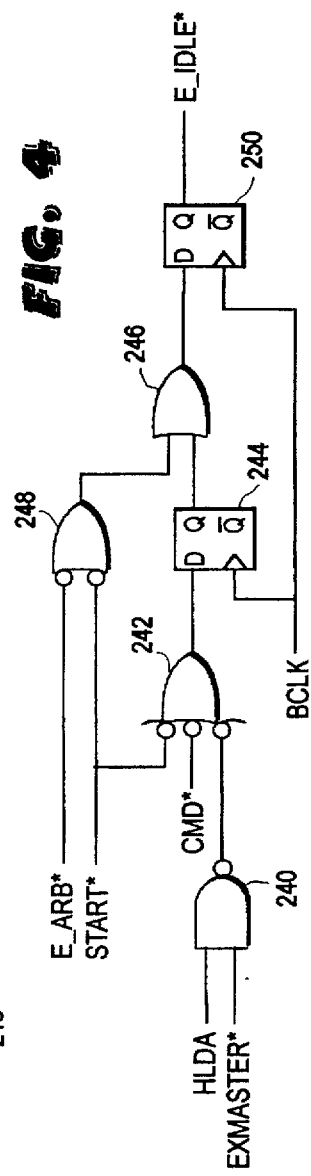
FIG. 4 is a schematic diagram of EISA bus idle determining circuitry used in the second computer.

The $E_{13}$ IDLE* signal provided by the CSP 146 is developed as shown in FIG. 4. The HLDA and EXMASTER* signals are provided to the two inputs to a two input NAND gate 240. The HLDA signal is a hold acknowledge signal which indicates that a device other than CPU0 120 or CPU1 122 are in control of the EISA bus 142. The EXMASTER* signal is a signal which indicates that an EISA bus master is in control of the EISA bus 142. The signals are both provided as part of the arbitration circuitry present in the CSP 146. The CSP 146 cooperates with the DSPs 148a and 148b to provide the functionality previously provided in the ISP 36 of the computer C1. Basically the ISP 36 is split into common portions present in the CSP 146 and distributed portions contained in DSP 148a and 148b. The major portions of the DMA controller, the arbitration circuitry and basic interrupt input logic are contained in the CSP 146, while individual interrupt prioritizers, timers, and certain DMA circuitry are contained in the DSPs 148a and 148b. As the CSP 146 contains the arbitration circuitry and so includes the EXMASTER* and HLDA signals, it is an appropriate place to provide this logic. For a more detailed explanation of the organization of the CSP 146 and the DSPs 148a and 148b, please refer to application Ser. No. 07/955, 683, entitled "Assignment of DMA, Interrupt and Timer Functions to Implement Symmetrical Processing in a Multiprocessor Computer System", filed on Oct. 2, 1992, now U.S. Pat. No. 5,437,042, which is hereby incorporated by reference.

The output of the NAND gate 240 is provided as one input to a three input NAND gate 242. The second input to the NAND gate 242 is the CMD signal, while the final input is the START* signal. These are EISA bus signals which indicate the beginning or address portion and data portion of bus cycles. The output of the NAND gate 242 is provided to the D input of a D-type flip-flop 244. The non-inverted output of the flip-flop 244 is provided as one input to a two input OR gate 246. The second input to the OR gate 246 is provided by the output of a two input NAND gate 248. The inputs to the NAND gate 248 are the START* signal and a signal referred to as E_ARB*. The E_ARB* signal is provided by the CSP 146 for a single BCLK period each time the arbiter contained in the CSP 146 grants the EISA bus 142 to a new owner. As the bus is actually being utilized during the control transfer, the E_ARB* signal accounts for this utilization. The output of the OR gate 246 is provided to the D input of a D-type flip-flop 250. The flip-flops 244 and 250 are clocked by the BCLK signal. The output of the flip-flop 250 is the E_IDLE* signal.

In this manner the circuitry readily tracks the states where the EISA bus is controlled by an entity other than the CPUs, these other entities including a bus master, either EISA or ISA; the DMA controller; the refresh circuitry and the portions during which the start and command signals are active and also accounts for the arbitration periods between controlling masters. Thus the E_IDLE* signal is low or asserted only for the proper period, but not necessarily at exactly the same time as the EISA bus is idle.

As noted above, the CSM 78, 172 also contains circuitry of its own for use in a system which does not contain the CSP 146. A state machine as illustrated in FIG. 5 is utilized to track the state of the EISA bus. The state machine is clocked by the BCLK signal. Upon reset the state machine initializes to an IDLE state. The state machine proceeds from the IDLE state to the BUSY state on any BCLK signal rising edge where the START, CMD, IOWC, IORC, MRDC or MWTC signals are asserted. Thus the transfer from IDLE to BUSY is made during the active portions of EISA cycles and also during the active portions of the ISA cycles. Control otherwise remains in the IDLE state. Control returns from the BUSY state to the IDLE state on a rising BCLK signal when none of the START, CMD, IOWC, IORC, MRDC or MWTC signals are asserted, indicating that no cycles are active. Otherwise control remains in the BUSY state.

The indication that the state machine is in the IDLE state is used with other signals as shown in FIG. 6 to develop the EISA_IDLE signal. A six input NOR gate 300 receives the MAK<5..0>signals, which are present on the EISA bus 34. These signals indicate that a master request to obtain the EISA bus has been acknowledged. Thus if any of these signals is active, then an EISA bus master is controlling the bus operation. The output of the NOR gate 300 is provided as one input to a ten input AND gate 302. The other inputs to the AND gate are the indication that the state machine is in the idle condition, and the REFRESH*, START*, CMD*, MRDC* and MWTC*, IORC*, IOWC* and MODE* signals are high or not asserted.

The MODE* signal is preferably an indication as indicated by a pin present on the CSM 78 or 172 to indicate the mode of operation. For example, if the CSM 172 is being utilized in conjunction with the CSP 146, then the MODE input is connected high so that the EISA_IDLE signal is always at a low condition. In this manner, the E_IDLE signal is utilized by the OR gate 204 as the main source for controlling the operation of the counter 200. On the other hand, if the CSM 78, 172 is used in the computer system like C1, then the MODE input is grounded so that the MODE* signal is high and the EISA_IDLE signal is active. In that case the E_IDLE input to the CSM 78 is grounded so that extraneous inputs are not received to the OR gate 204.

Therefore, it can be seen that the IDLE condition of the EISA bus is readily developed using the circuitry of FIGS. 4–6. The circuitry of FIG. 3 then counts the number of BCLK periods in which the EISA bus is idle.

Figure 7:
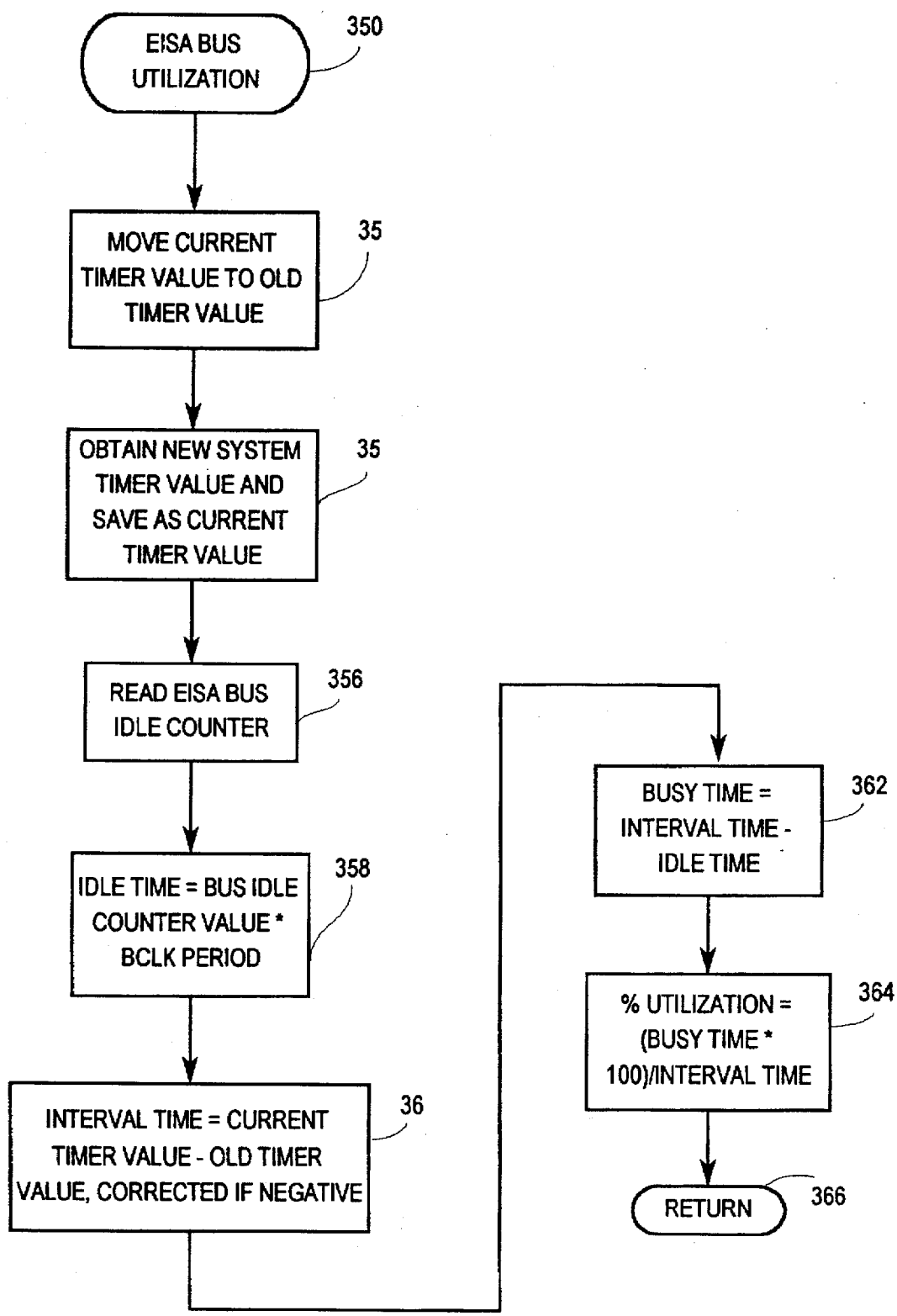
FIG. 7 is a flow chart to illustrate development of the bus utilization percentage from a bus idle counter value.

Certain software is used in conjunction with the EISA bus utilization counter to develop the actual percentage utilization number. A flowchart of operation is shown in FIG. 7. The EISA bus utilization sequence 350 commences operation at step 252, where a current timer value is moved to a storage location referred to as the old timer value. In step 354, the computer system obtains a new system timer value and saves this value as the current timer value. In the computer system C2, a 48 bit free running timer is preferably contained in the SDB 144. Details of the of the development of this timer are provided in application Ser. No. 07/955,500, entitled "Extended Duration High Resolution Timer", and filed on Oct. 2, 1992, now U.S. Pat. No. 5,463,761, which is hereby incorporated by reference. This provides a hardware timer having a 120 ns resolution as a system timer for general timer references, such as those used in the EISA bus utilization sequence 250. In a computer system such as computer system C1, preferably the system timer value is obtained from a modification to the periodic timer interrupt, preferably a 16.7 ms interrupt present in IBM PC compatible computers which provides basic system timing functions. By slightly modifying the interrupt sequence which handles this tick timer, an on-going system timer can be developed for various purposes including for use by the EISA bus utilization sequence 350. Alternatively, one of the timers in the ISP 36 could be utilized.

After the new timer value has been obtained and stored, control proceeds to step 356 where the EISA bus idle counter is read. As noted above, when this is done, the counter 200 is reset to restart operations. Control then proceeds to step 358, where the idle time is determined by multiplying the bus idle counter value by the BCLK signal period. Preferably the BCLK signal period is contained in a register and is known for the particular computer system. In the general case the BCLK signal has a base period of 125 ns, but this may vary slightly from system to system. By knowing this period and the number of idle counts, the idle time is developed in step 358. Control then proceeds to step 360, where the interval time is determined by subtracting the old timer value from the current timer value. Should the timer have overflowed, the value will be negative and it is corrected to properly reflect a positive value. Control then proceeds to step 360, where the busy time is determined by subtracting the idle time as determined in step 358 from the interval time as determined in step 360. It is noted that the interval time should be less than the rollover time of the counter 200, which is approximately 536 seconds if the BCLK signal is the conventional 8 MHz signal. Control then proceeds to step 364, where the percentage of bus utilization is determined by multiplying the busy time times 100 and dividing by the interval time. The percentage utilization value is then provided as a return variable when a return is executed in step 366.

Thus by providing the counter 200, properly advancing it only when the EISA bus is idle and keeping track of the amount of time between accesses to read the counter 200, the percentage utilization is developed in the EISA bus utilization sequence 350.

Therefore in a system according to the present invention, the utilization of the EISA bus can be readily determined to allow LAN administrators and developers to determine if the EISA bus has become a limitation in the particular file server or if there is sufficient bandwidth to receive additional circuit boards.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A system for determining utilization of a bus on which a plurality of different cycles may be run, the cycles having a length which is a multiple of a synchronizing clock, and which may be controlled by a number of sources, comprising:

means for determining if the bus is idle;

means for counting the number of synchronizing clock periods wherein the bus is determined to be idle;

means for periodically reading said means for counting and obtaining a counter value;

means for determining the time between said periodic reading of said means for counting; and means for determining a bus utilization value utilizing a ratio of said counter value times the synchronizing clock period to said time between periodic reading.

2. The system of claim 1, wherein said bus includes cycle start and continuance signals and arbitration result signals and said idle determining means monitors said signals to determine bus idle condition.

3. The system of claim 2, wherein said bus is an EISA bus, said cycle start and continuance signals include the START* and CMD* signals and said arbitration result signals include the HLDA and EXMASTER* signals.

4. The system of claim 3, wherein said cycle start and continuance signals further include the IORC* IOWC*, MRDC* and MWTC* signals.

5. The system of claim 4, wherein said arbitration result signals include the master bus request acknowledge signals.

6. The system of claim 3, wherein said bus idle determining means further monitors for arbitration times of said bus.

7. The system of claim 1, wherein said means for counting is cleared when said means for periodically reading reads said means for counting.

8. The system of claim 1, wherein said means for determining a bus utilization value multiplies said counter value times the synchronizing clock period, subtracts this value from said time between periodic reading and divides the result by said time between periodic reading.

* * * * *